United States Patent
Kuwayama et al.

(10) Patent No.: US 10,226,966 B2
(45) Date of Patent: *Mar. 12, 2019

(54) PNEUMATIC RADIAL TIRE FOR PASSENGER VEHICLE, METHOD FOR USING THE TIRE, AND TIRE-RIM ASSEMBLY INCLUDING THE TIRE

(75) Inventors: Isao Kuwayama, Kodaira (JP); Shintaro Hatanaka, Kodaira (JP); Hiroyuki Matsumoto, Kodaira (JP)

(73) Assignee: BRIDGESTONE CORPORATION, Chuo-ku, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/128,397

(22) PCT Filed: Jun. 22, 2012

(86) PCT No.: PCT/JP2012/004081
§ 371 (c)(1),
(2), (4) Date: Dec. 20, 2013

(87) PCT Pub. No.: WO2012/176476
PCT Pub. Date: Dec. 27, 2012

(65) Prior Publication Data
US 2014/0138003 A1 May 22, 2014

(30) Foreign Application Priority Data
Jun. 22, 2011 (JP) .................................. 2011-138832

(51) Int. Cl.
*B60C 3/04* (2006.01)
*B60C 11/03* (2006.01)

(52) U.S. Cl.
CPC ............ *B60C 3/04* (2013.01); *B60C 11/0332* (2013.01); *Y02T 10/862* (2013.01)

(58) Field of Classification Search
CPC ....... B60C 3/04; B60C 11/0304; B60C 11/04; B60C 11/042; B60C 11/0332;
(Continued)

(56) References Cited

U.S. PATENT DOCUMENTS 2,600,231 A * 6/1952 Ewart ...................... B60C 3/04
152/209.1
3,786,851 A 1/1974 Mirtain et al.
(Continued)

FOREIGN PATENT DOCUMENTS

BG 61716 B1 4/1998
EP 0370699 A2 5/1990
(Continued)

OTHER PUBLICATIONS

Coker Classic Radial 600R16—Blackwall Tire as accessed at http://www.tiresandwires.com/Coker-Classic-Radial-600R16--Blackwall-Tire_p_69.html on Jan. 11, 2015.*
(Continued)

*Primary Examiner* — Justin R Fischer
*Assistant Examiner* — Philip N Schwartz
(74) *Attorney, Agent, or Firm* — Sughrue Mion, PLLC

(57) ABSTRACT

The present invention provides: a pneumatic radial tire for a passenger car, the tire having cross sectional width SW and outer diameter OD satisfying a predetermined relationship formula when the tire is assembled with a rim and inflated at internal pressure of at least 250 kPa; a tire-rim assembly formed by assembling bead portions of said tire with the rim; and a method for using a tire, including preparing a pneumatic radial tire for a passenger car in which cross sectional width SW and outer diameter OD of the tire satisfy a predetermined relationship formula, and using the tire at internal pressure of at least 250 kPa.

4 Claims, 15 Drawing Sheets

(58) Field of Classification Search
CPC .............. B60C 11/03; B60C 2011/0341; B60C 2011/0344; B60C 2011/0348; B60C 2011/0351; B60C 2011/0353; B60C 2011/0355; B60C 2011/0358; B60C 2011/036; B60C 2011/0362; B60C 2011/0365; B60C 2011/0369; B60C 2011/0372; B60C 2011/0381; B60C 2011/0383
USPC ........................................................ 152/454
See application file for complete search history.

(56) References Cited

U.S. PATENT DOCUMENTS

| | | | |
|---|---|---|---|
| 5,882,450 A | 3/1999 | Benchea | |
| 6,481,479 B1 | 11/2002 | Weed et al. | |
| 2004/0140033 A1* | 7/2004 | Nomura | B60C 1/0008 152/510 |

FOREIGN PATENT DOCUMENTS

| | | | | |
|---|---|---|---|---|
| EP | 2565054 A1 | 3/2013 | | |
| FR | 2719525 A1 | 11/1995 | | |
| JP | 53040903 A | 4/1978 | | |
| JP | S57-066003 A | 4/1982 | | |
| JP | 61-146604 A | 7/1986 | | |
| JP | S63-106102 A | 5/1988 | | |
| JP | 3-213404 A | 9/1991 | | |
| JP | H05-162506 A | 6/1993 | | |
| JP | H07-005810 U | 1/1995 | | |
| JP | 07-40706 A | 2/1995 | | |
| JP | 07069008 A * | 3/1995 | ............ | B60C 11/12 |
| JP | H07-304308 A | 11/1995 | | |
| JP | 8-2214 A | 1/1996 | | |
| JP | 08-164709 A | 6/1996 | | |
| JP | H10-258603 A | 9/1998 | | |
| JP | 10-297213 A | 11/1998 | | |
| JP | 11192809 A | 7/1999 | | |
| JP | 2000-190706 A | 7/2000 | | |
| JP | 2003146010 A | 5/2003 | | |
| JP | 2005-219537 A | 8/2005 | | |
| JP | 2005-297859 A | 10/2005 | | |
| JP | 2008168800 A * | 7/2008 | ............ | B60C 1/00 |
| JP | 2009101743 A | 5/2009 | | |
| JP | 2010-47191 A | 3/2010 | | |
| JP | 2010137819 A * | 6/2010 | ............ | B60C 9/22 |
| JP | 2011-105066 A | 6/2011 | | |

OTHER PUBLICATIONS

Machine translation of JP08-164709 (no date).*
Machine translation of JP07-069008 (no date).*
Machine translation of JP2008-168800 (no date).*
Machine translation of JP2010-137819 (no date).*
Machine translation of JP2000-190706 (no date).*
Firestone Double Whitewall 700-20 as found on the Internet Archive on Aug. 29, 2011 at http://web.archive.org/web/20110829001052/ http://store.cokertire.com/tire-styles/bias-ply-tires/wide-whitewall/ firestone-3-1-4-inch-double-whitewall-700-20.html.*
05-07 Cadillac STS Factory Goodyear T145/70R17 Spare Wheel Tire OEM V8 as accessed from http://www.ebay.com/itm/05-07-CADILLAC-STS-FACTORY-GOODYEAR-T145-70R17-SPARE-WHEEL-TIRE-OEM-V8-/172734714482 on Aug. 14, 2017.*
Communication from the Japanese Patent Office dated Nov. 11, 2014 in a counterpart Japanese Patent Application No. 2013-521477.
International Search Report for PCT/JP2012/004081, dated Sep. 11, 2012.
Communication dated Jul. 15, 2015 from the State Intellectual Property Office of the People's Republic of China issued in corresponding Chinese application No. 201280037624.X.
Communication dated May 12, 2015 from the Japanese Patent Office in counterpart application No. 2013-521477.
Communication dated Jan. 21, 2015 from the European Patent Office in counterpart application No. 12802014.6.
Communication dated Aug. 25, 2015, issued by the Japan Patent Office in corresponding Japanese Application No. 2013-521477.
Non Final Office Action dated Jun. 7, 2017 issue in U.S. Appl. No. 14/355,738.
"The European Tyre and Rim Technical Organisation" Standards Manual 2007 (4 pages total).
ETRTO Standards Manual 2007, The European Tyre and Rim Technical Organisation, pp. 25, 27 and 29.

* cited by examiner

FIG. 3A
Ring deformation ✗
FIG. 3B
Eccentric center-shift deformation ◯
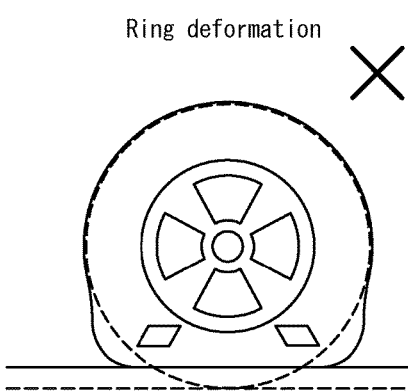
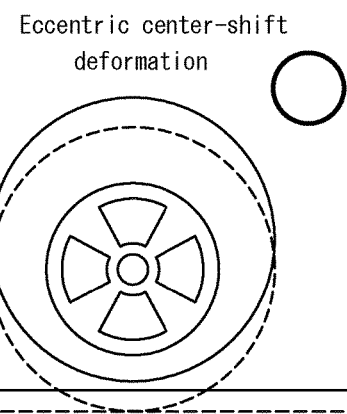
— Prior to deformation
------ After deformation Shearing deformation

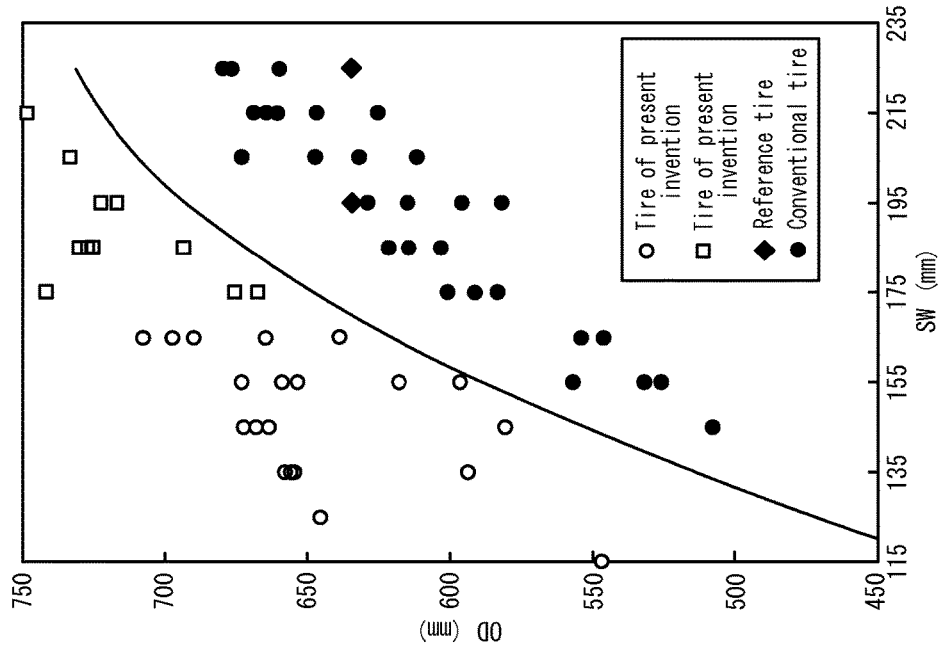
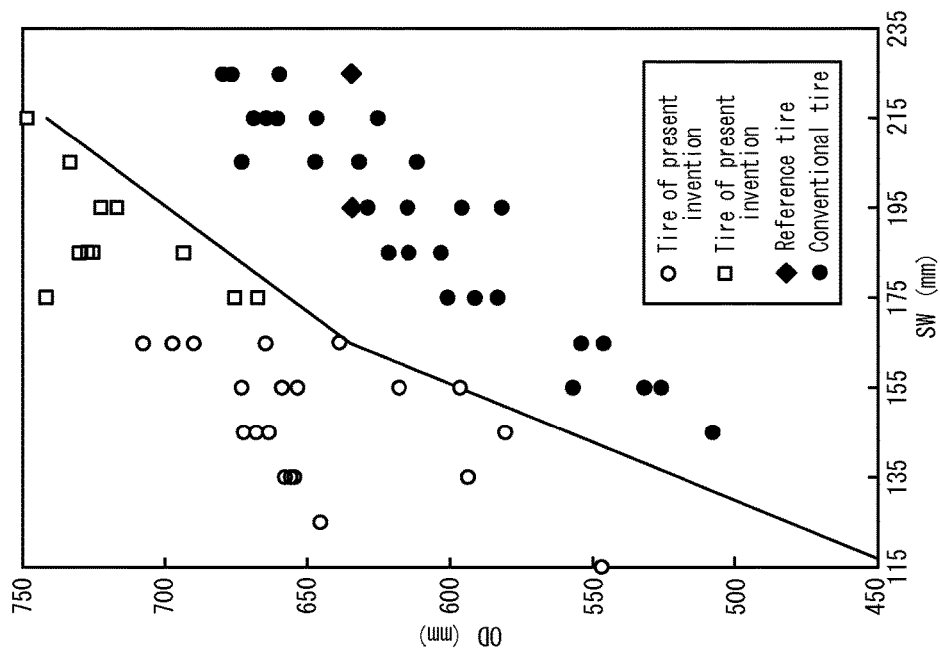

PNEUMATIC RADIAL TIRE FOR PASSENGER VEHICLE, METHOD FOR USING THE TIRE, AND TIRE-RIM ASSEMBLY INCLUDING THE TIRE

TECHNICAL FIELD

The present invention relates to a pneumatic radial tire for a passenger vehicle, a method for using the tire, and a tire-rim assembly including the tire and in particular to a pneumatic radial tire for a passenger vehicle where both a rolling resistance value (RR value) and weight of the tire have been reduced in a compatible manner, a method for using the tire, and a tire-rim assembly where the tire is assembled with a rim.

BACKGROUND ART

Bias tires having relatively narrow cross sectional widths were predominantly used in vehicles up to around 1960 because vehicles in those days were relatively lightweight, had relatively low cruising speed required thereof and thus did not put so much stress on the tires. However, radial tires are predominant these days and those having wider widths are in particular on demand due to increase in weight and speed of vehicles (e.g. PTL 1).

However, increasing widths of tires decreases free space in a vehicle and deteriorates comfortablility therein. Further, wider widths of tires increase air resistance and cause another problem of poor fuel consumption rates.

There has been increasingly a demand for a lower fuel consumption rate as people are more concerned about environmental issues.

Electric vehicles which are being developed for use in future, in particular, must have sufficient space for accommodating driving units such as a motor for controlling torque of rotating tires around drive shafts. Ensuring sufficient space in vicinities of tires is becoming increasing important in this connection.

In terms of improving a fuel consumption rate of a vehicle, it is known that increasing diameter and/or width of a tire effectively decreases a rolling resistance value (RR value) of the tire. However, increasing diameter and/or width of a tire also increases tire weight and air resistance thereon, thereby causing problems of higher resistance experienced by the vehicle and too much load exerted on the tire.

CITATION LIST

Patent Literature

PTL 1: JP-A 07-040706

SUMMARY OF THE INVENTION

Technical Problems

The present invention aims at solving the problems described above and an object thereof is to provide a pneumatic radial tire for a passenger vehicle where both a rolling resistance value (RR value) and weight of the tire have been significantly reduced in a compatible manner, as well as a tire-rim assembly where the tire is assembled with a rim.

Further, another object of the present invention is to provide a method for using a tire, which method significantly reduces rolling resistance of the tire.

Solution to the Problems

The inventors of the present invention keenly studied to solve the problems described above.

As a result, the inventors, paying attention to deformation of a tread as a main factor of energy loss affecting a rolling resistance value of a tire, newly discovered a technique of well suppressing, in spite of a narrowed tire width, tread deformation caused by deflection of a crown portion of the tire.

The present invention has been contrived based on the aforementioned discovery and main structural features are as follows.

(1) A pneumatic radial tire for a passenger vehicle, having a carcass constituted of plies as radially-disposed cords and provided in a toroidal shape across a pair of bead portions, characterized in that:

provided that SW and OD represent cross sectional width and outer diameter of the tire, respectively, and that the tire assembled with a rim is inflated at an internal pressure of at least 250 kPa, SW/OD≤0.26 when SW<165 (mm); and SW and OD satisfy a formula shown below when SW≥165 (mm).

$$OD \leq 2.135 \times SW + 282.3$$

(2) A pneumatic radial tire for a passenger vehicle, having a carcass constituted of plies as radially-disposed cords and provided in a toroidal shape across a pair of bead portions, characterized in that:

provided that SW and OD represent cross sectional width and outer diameter of the tire, respectively, and that the tire assembled with a rim is inflated at an internal pressure of at least 250 kPa, SW and OD satisfy a formula shown below.

$$OD \leq -0.0187 \times SW^2 + 9.15 \times SW - 380$$

(3) A pneumatic radial tire for a passenger vehicle, having a carcass constituted of plies as radially-disposed cords and provided in a toroidal shape across a pair of bead portions, characterized in that:

provided that SW and OD represent cross sectional width and outer diameter of the tire, respectively, SW and OD satisfy a formula shown below when SW≥165 (mm)

$$OD \leq 2.135 \times SW + 282.3; \text{ and}$$

provided that "the maximum load prescribed for the passenger vehicle" represents the largest load value among respective four load values exerted on four tires of the passenger vehicle when the prescribed upper limit number of occupants ride in the passenger vehicle and that "ground-contact width" of the tire represents the maximum width in the tread widthwise direction of a ground-contact surface of the tire, ground-contact width of the tire is equal to or narrower than 175 mm when the maximum load prescribed for the passenger vehicle is exerted on the tire assembled with a rim.

(4) A pneumatic radial tire for a passenger vehicle, having a carcass constituted of plies as radially-disposed cords and provided in a toroidal shape across a pair of bead portions, characterized in that:

provided that SW and OD represent cross sectional width and outer diameter of the tire, respectively, SW/OD≤0.26 when SW<165 (mm); and provided that "the maximum load prescribed for the passenger vehicle" represents the largest load value among respective four load values exerted on four tires of the passenger vehicle when the prescribed upper limit number of occupants ride in the passenger vehicle and that "ground-contact width" of the tire represents the maximum width in the tread widthwise direction of a ground-contact surface of the tire, ground-contact width of the tire is equal to or narrower than 150 mm when the maximum load prescribed for the passenger vehicle is exerted on the tire assembled with a rim.

(5) A pneumatic radial tire for a passenger vehicle, having a carcass constituted of plies as radially-disposed cords and provided in a toroidal shape across a pair of bead portions, characterized in that:

provided that SW and OD represent cross sectional width and outer diameter of the tire, respectively, SW and OD satisfy a formula shown below.

$$OD \leq -0.0187 \times SW^2 + 9.15 \times SW - 380;\text{ and}$$

provided that "the maximum load prescribed for the passenger vehicle" represents the largest load value among respective four load values exerted on four tires of the passenger vehicle when the prescribed upper limit number of occupants ride in the passenger vehicle and that "ground-contact width" of the tire represents the maximum width in the tread widthwise direction of a ground-contact surface of the tire, ground-contact width of the tire is equal to or narrower than 175 mm when the maximum load prescribed for the passenger vehicle is exerted on the tire assembled with a rim.

(6) The pneumatic radial tire for a passenger vehicle of any of (3) to (5) above, wherein provided that "ground-contact length" represents the maximum length in the tread circumferential direction of a ground-contact surface of the tire, ground-contact length of the tire is in the range of 90 mm to 140 mm.

(7) The pneumatic radial tire for a passenger vehicle of any of (1) to (6) above, wherein SW/OD≤0.26.

(8) The pneumatic radial tire for a passenger vehicle of any of (1) to (7) above, wherein SW/OD≤0.24.

(9) A tire-rim assembly formed by assembling bead portions of a pneumatic radial tire for a passenger vehicle with a rim, characterized in that: the tire has a carcass constituted of plies as radially-disposed cords and provided in a toroidal shape across a pair of the bead portions; the tire-rim assembly has an internal pressure of at least 250 kPa; provided that SW and OD represent cross sectional width and outer diameter of the tire, respectively, SW/OD≤0.26 when SW<165 (mm); and SW and OD satisfy a formula shown below when SW≥165 (mm).

$$OD \geq 2.135 \times SW + 282.3$$

(10) A tire-rim assembly formed by assembling bead portions of a pneumatic radial tire for a passenger vehicle with a rim, characterized in that: the tire has a carcass constituted of plies as radially-disposed cords and provided in a toroidal shape across a pair of the bead portions; the tire-rim assembly has an internal pressure of at least 250 kPa; and provided that SW and OD represent cross sectional width and outer diameter of the tire, respectively, SW and OD satisfy a formula shown below.

$$OD \leq -0.0187 \times SW^2 + 9.15 \times SW - 380$$

(11) A tire-rim assembly formed by assembling bead portions of a pneumatic radial tire for a passenger vehicle with a rim, characterized in that: the tire has a carcass constituted of plies as radially-disposed cords and provided in a toroidal shape across a pair of the bead portions; provided that SW and OD represent cross sectional width and outer diameter of the tire, respectively, SW and OD satisfy a formula shown below when SW≥165 (mm)

$$OD \geq 2.135 \times SW + 282.3;\text{ and}$$

provided that "the maximum load prescribed for the passenger vehicle" represents the largest load value among respective four load values exerted on four tires of the passenger vehicle when the prescribed upper limit number of occupants ride in the passenger vehicle and that "ground-contact width" of the tire represents the maximum width in the tread widthwise direction of a ground-contact surface of the tire, ground-contact width of the tire is equal to or narrower than 175 mm when the maximum load prescribed for the passenger vehicle is exerted on the tire-rim assembly.

(12) A tire-rim assembly formed by assembling bead portions of a pneumatic radial tire for a passenger vehicle with a rim, characterized in that: the tire has a carcass constituted of plies as radially-disposed cords and provided in a toroidal shape across a pair of the bead portions; provided that SW and OD represent cross sectional width and outer diameter of the tire, respectively, SW/OD≤0.26 when SW<165 (mm); and provided that "the maximum load prescribed for the passenger vehicle" represents the largest load value among respective four load values exerted on four tires of the passenger vehicle when the prescribed upper limit number of occupants ride in the passenger vehicle and that "ground-contact width" of the tire represents the maximum width in the tread widthwise direction of a ground-contact surface of the tire, ground-contact width of the tire is equal to or narrower than 150 mm when the maximum load prescribed for the passenger vehicle is exerted on the tire-rim assembly.

(13) A tire-rim assembly formed by assembling bead portions of a pneumatic radial tire for a passenger vehicle with a rim, characterized in that: the tire has a carcass constituted of plies as radially-disposed cords and provided in a toroidal shape across a pair of the bead portions; provided that SW and OD represent cross sectional width and outer diameter of the tire, respectively, SW and OD satisfy a formula shown below.

$$OD \geq -0.0187 \times SW^2 + 9.15 \times SW - 380;\text{ and}$$

provided that "the maximum load prescribed for the passenger vehicle" represents the largest load value among respective four load values exerted on four tires of the passenger vehicle when the prescribed upper limit number of occupants ride in the passenger vehicle and that "ground-contact width" of the tire represents the maximum width in the tread widthwise direction of a ground-contact surface of the tire, ground-contact width of the tire is equal to or narrower than 175 mm when the maximum load prescribed for the passenger vehicle is exerted on the tire-rim assembly.

(14) The tire-rim assembly of any of (11) to (13) above, wherein provided that "ground-contact length" represents the maximum length in the tread circumferential direction of a ground-contact surface of the tire, ground-contact length of the tire is in the range of 90 mm to 140 mm.

(15) The tire-rim assembly of any of (9) to (14) above, wherein SW/OD≤0.26.

(16) The tire-rim assembly of any of (9) to (15) above, wherein SW/OD≤0.24.

(17) A method for using a pneumatic radial tire for a passenger vehicle, comprising the steps of: preparing a pneumatic radial tire for a passenger vehicle such that the tire has a carcass constituted of plies as radially-disposed cords and provided in a toroidal shape across a pair of bead portions and satisfies, provided that SW and OD represent cross sectional width and outer diameter of the tire, respectively, SW/OD≤0.26 when SW<165 (mm) and a formula: OD≥2.135×SW+282.3 when SW≥165 (mm); and using the tire thus prepared at an internal pressure of at least 250 kPa.

(18) A method for using a pneumatic radial tire for a passenger vehicle, comprising the steps of: preparing a pneumatic radial tire for a passenger vehicle such that the tire has a carcass constituted of plies as radially-disposed cords and provided in a toroidal shape across a pair of bead portions and satisfies, provided that SW and OD represent cross sectional width and outer diameter of the tire, respectively, SW and OD satisfy a formula shown below $$OD \geq -0.0187 \times SW^2 + 9.15 \times SW - 380;\ and$$

using the tire thus prepared at an internal pressure of at least 250 kPa.

(19) The method for using a pneumatic radial tire for a passenger vehicle of (17) or (18) above, further comprising setting ratio SW/OD to be 0.26 or less.

(20) The method for using a pneumatic radial tire for a passenger vehicle of any of (17) to (19) above, further comprising setting ratio SW/OD to be 0.24 or less.

Advantageous Effect of the Invention

According to the present invention, it is possible to provide a pneumatic radial tire for a passenger vehicle where both a rolling resistance value and weight of the tire have been significantly reduced in a compatible manner, as well as a tire-rim assembly where the tire is assembled with a rim having a width corresponding to a bead width of the tire. Further, according to the present invention, it is possible to provide a method for using a tire, which method significantly reduces rolling resistance of the tire.

The pneumatic radial tire for a passenger vehicle of the present invention, having a narrowed width, experiences relatively small air resistance. Further, the pneumatic radial tire for a passenger vehicle of the present invention exhibits relatively small rolling resistance as described above. The tire, the tire-rim assembly and the method for using the tire of the present invention therefore can significantly improve a fuel consumption rate of a vehicle.

Yet further, the pneumatic radial tire for a passenger vehicle and the tire-rim assembly of the present invention, each having a narrowed width and a relatively large outer diameter, ensure a relatively wide space in a vehicle and thus are useful for a tire and a tire-rim assembly for an electric vehicle in particular.

BRIEF DESCRIPTION OF THE DRAWINGS

FIG. 3A and FIG. 3B are views each explaining deformation of a tire.

FIG. 14A and FIG. 14B are views each showing relationship between SW and OD in the tires of Examples and Conventional Examples.

DESCRIPTION OF THE EMBODIMENTS

How a pneumatic radial tire for a passenger vehicle of the present invention (which tire will be referred to simply as "tire" hereinafter) has been realized will be described below.

Figure 1A:
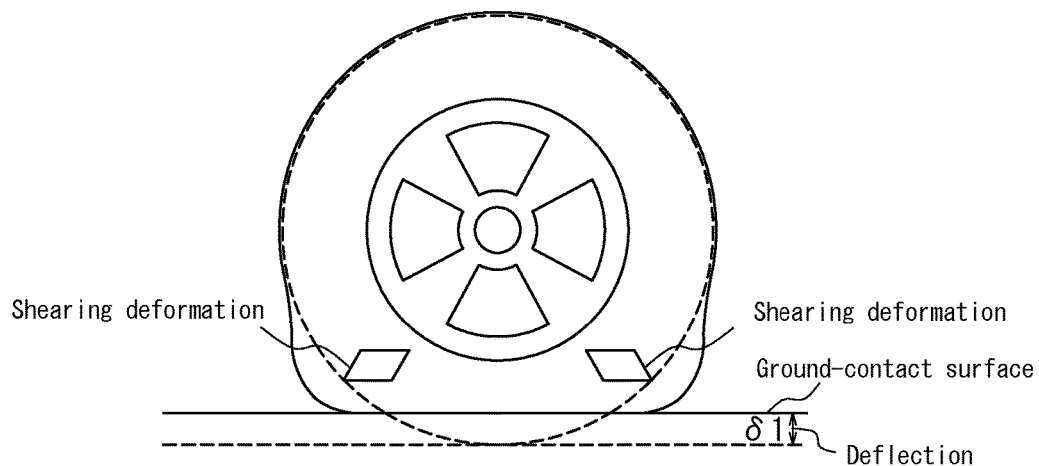
FIG. 1A is a side view of a tire and FIG. 1B is a cross sectional view, in the tire circumferential direction, of the vicinity of a ground-contact surface of the tire.

FIG. 1A shows a state where a crown portion of a tire is deflected under load exerted on the tire. Tread rubber is subjected to shearing deformation in the tire circumferential direction due to the deflection of the crown portion of the tire as schematically shown by parallelograms in FIG. 1A. This shearing deformation causes energy loss when it is repeated during rotation of the tire, thereby increasing rolling resistance of the tire. Accordingly, it is important to reduce magnitude of deflection when a tire is brought into contact with the ground in order to decrease rolling resistance of the tire.

Figure 1B:
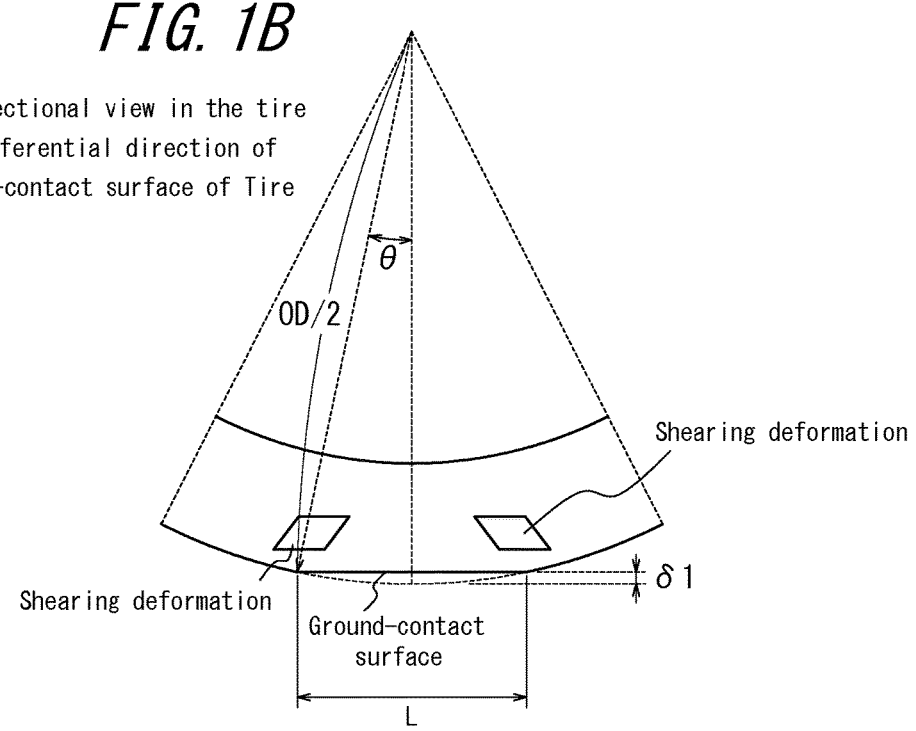

FIG. 1B is a cross sectional view, in the tire circumferential direction, of the vicinity of a ground-contact surface of a tire. Provided that OD (mm), δ1 (mm), and L (mm) represent outer diameter, magnitude of deflection, and ground-contact length in the circumferential direction of the tire, respectively, as shown in FIG. 1B, magnitude of deflection δ1 can be approximately represented in geometrical terms by following two formulae.

$$\delta 1 = (OD/2) \times (1 - \cos\theta) \quad \text{(Formula 1)}$$

$$\theta \approx \tan^{-1}\{(L/2)/(OD/2)\} \approx L/OD \quad \text{(Formula 2)}$$

Figure 2:
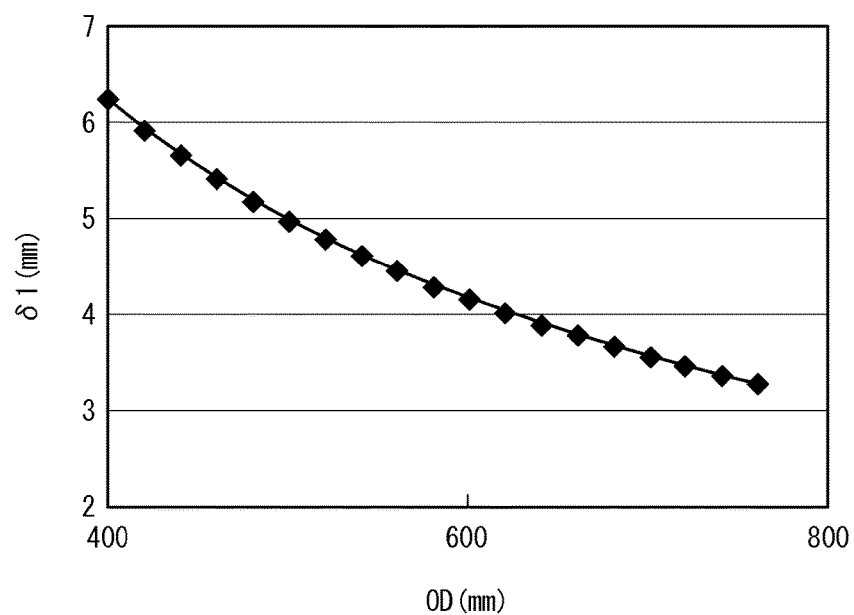
FIG. 2 is a view showing a relationship between outer diameter OD and magnitude of deflection δ1 of a tire.

FIG. 2 is a view showing a relationship between outer diameter OD and magnitude of deflection δ1 of a tire when conventional tires of various sizes are each assembled with an application rim and inflated at a prescribed internal pressure with the maximum load exerted thereon.

In the present invention, in connection with the aforementioned descriptions of the conventional tires, an "application rim" represents a rim prescribed in accordance with a tire by an industrial standard valid in the area where the tire is produced and used and examples of the industrial standard include: JATMA (The Japan Automobile Tyre Manufacturers Association, Inc.) YEAR BOOK in Japan; ETRTO (European Tyre and Rim Technical Organisation) STANDARD MANUAL in Europe; and TRA (THE TIRE and RIM ASSOCIATION INC.) YEAR BOOK in the United States. "Prescribed internal pressure" is determined according to an application rim corresponding to the size of a radial ply tire and a table of air pressure vs. loading capacity prescribed by JATMA YEAR BOOK and the like. Further, "maximum load" represents the maximum load allowed to be exerted on a single tire (the maximum loading capacity of a single tire) in an application size prescribed in the predetermined industrial standards described above.

It is understood from formula 1, formula 2 and FIG. 2 described above that increasing outer diameter effectively decreases magnitude of deflection δ1. That is, increasing outer diameter of a tire suppresses shearing deformation in the tire circumferential direction of tread rubber of a tire and thus effectively decreases rolling resistance of the tire.

Tensile force of a belt of a tire is expressed by formula 3 below (T: tensile force, P: internal pressure). It is understood from formula 3 that the larger outer diameter of a tire generates the larger tensile force of a belt of the tire.

$$T=(OD/2)\times P \quad \text{(Formula 3)}$$

Increasing tensile force of a belt of a tire increases ring rigidity (rigidity contributing to maintaining a ring-like shape of a tire) of the tire, thereby facilitating deformation of eccentrically shifting the entire ring (eccentric center-shift deformation), while maintaining a ring-like shape of the tire, as shown in FIGS. 3A and 3B. As a result, deformation of tread rubber is suppressed and thus a rolling resistance value of the tire decreases.

That is, increasing outer diameter of a tire increases tensile force of a belt and suppresses ring deformation of the tire, thereby effectively decreasing rolling resistance of the tire.

Next, the inventors of the present invention paid their attention to shearing deformation in the tire widthwise direction of tread rubber.

Figure 4A:
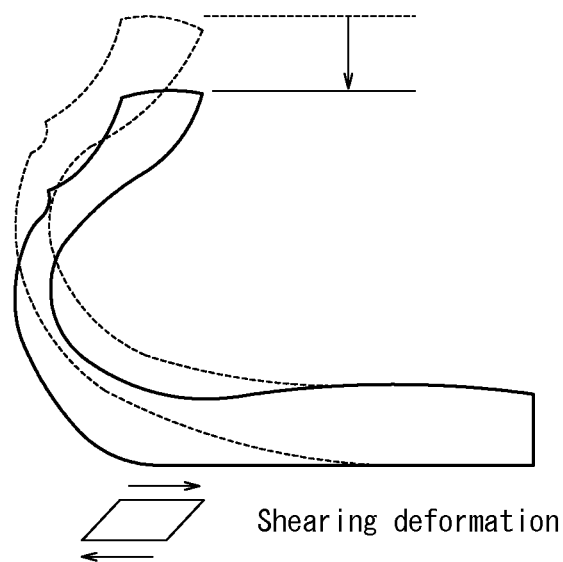
FIG. 4A and FIG. 4B are cross sectional views in the tire widthwise direction each explaining deformation of a tire.

Specifically, tread rubber experiences shearing deformation in the tire widthwise direction due to deflection of a crown portion of a tire when the tire is brought into contact with the ground, as schematically shown by a parallelogram in FIG. 4A. This shearing deformation, causing energy loss when it is repeated during rotation of the tire, increases rolling resistance of the tire.

Figure 4B:
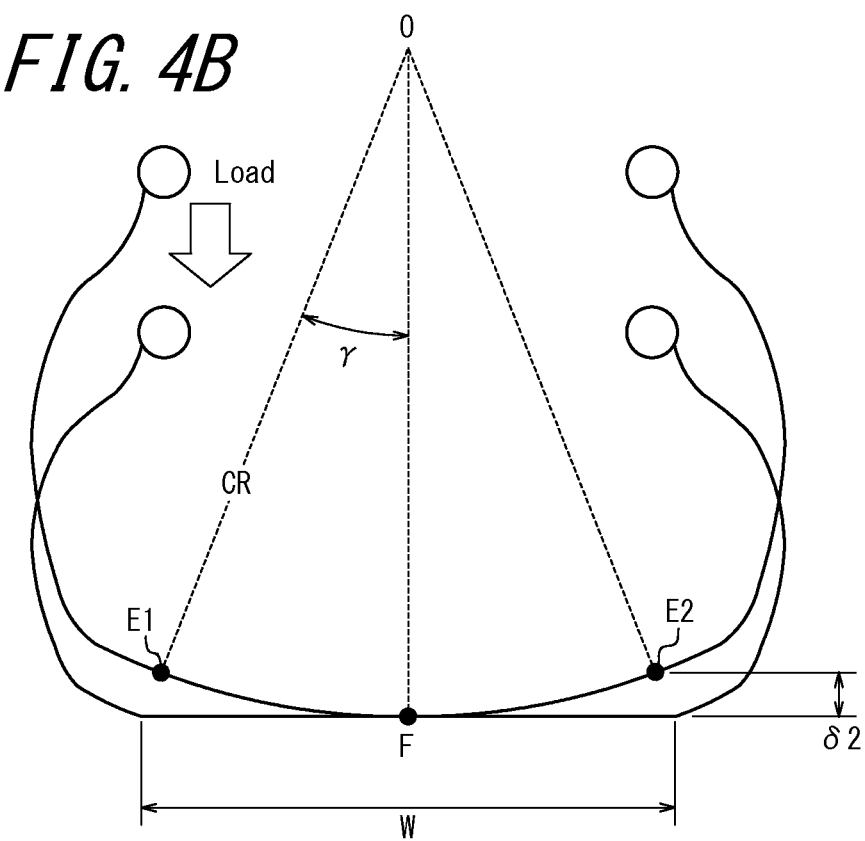

FIG. 4B is a cross sectional view in the tire widthwise direction of a ground-contact surface of a tire. E1 and E2 respectively represent positions which will be ground-contact ends when the maximum load, prescribed for each vehicle on which the tire is mounted, is exerted on the tire; and F and W (mm) respectively represent the center position in the widthwise direction and the ground-contact width in the widthwise direction in the cross sectional view shown in FIG. 4B.

Further, CR (mm) represents radius of a crown portion at E1 and E2 when a curve passing through the three points E1, E2 and F in the widthwise cross section is regarded as an arc in a state where no load is exerted on the tire; O represents the center of a circle including the arc; and γ(°) represents an angle formed by line OE1 with respect to the tire equatorial plane in the widthwise cross section in FIG. 4B.

Further, δ2 (mm) represents in FIG. 4B magnitude of deflection of the ground-contact ends E1, E2 in the tire radial direction under the maximum load prescribed for each vehicle on which the tire is mounted. In this connection, δ2 can be approximately represented in geometrical terms by following two formulae.

$$\delta 2 = CR \times (1-\cos \gamma) \quad \text{(Formula 4)}$$

$$\gamma \approx \tan^{-1}\{(W/2)/CR\} \approx W/2CR \quad \text{(Formula 5)}$$

Figure 5:
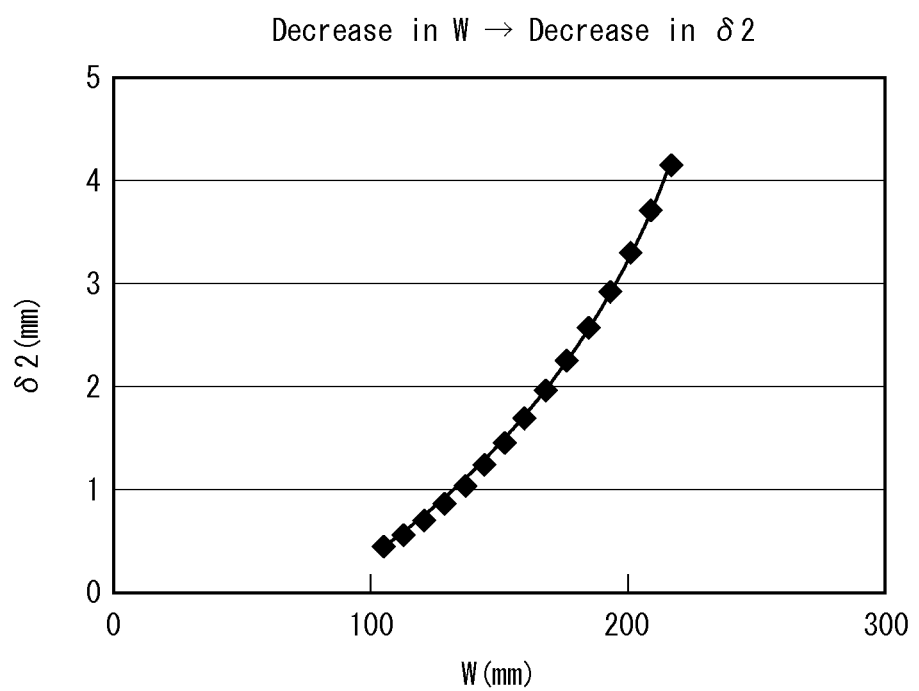
FIG. 5 is a view showing a relationship between ground-contact width W and magnitude of deflection δ2 of a tire.

FIG. 5 is a view showing a relationship between ground-contact width W and magnitude of deflection δ2 of a tire when conventional tires of various sizes are each assembled with an application rim and inflated at a prescribed internal pressure with the maximum load exerted thereon.

It is understood from formula 4, formula 5 and FIG. 5 described above that magnitude of deflection δ2 can be reduced by decreasing ground-contact width W. That is, decreasing tire width suppresses shearing deformation in the tire widthwise direction of tread rubber of a tire and thus effectively reduces rolling resistance of the tire.

Further, decreasing tire width effectively reduces tire weight, as well.

In summary, it has been revealed that a rolling resistance value of a tire can be effectively reduced, in spite of reduced tire weight, by appropriately controlling increase in diameter and width of the tire.

Figure 6:
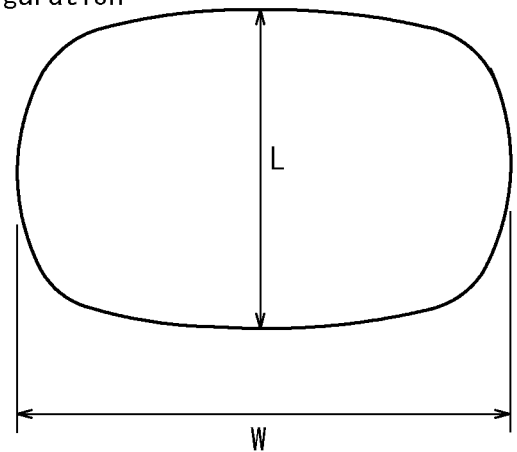
FIG. 6 is an explanatory view in connection with relationships between load, internal pressure, and ground-contact area of a tire.

Provided that L and W respectively represent ground-contact length and ground-contact width of a tire as shown in FIG. 6 and that P and Lo respectively represent internal pressure and load exerted on the tire in this connection, a relationship approximated by following formula, deduced from conditions of balanced force system, exists between a ground-contact surface of the tire and load exerted thereon.

$$Lo \approx W \times L \times P \quad \text{(Formula 6)}$$

It is understood from the formula 6 that decreasing ground-contact width W of the tire in order to suppress shearing deformation in the tire widthwise direction of tread rubber and reduce tire weight as described above in a state where load and internal pressure of a tire remain constant will increase ground-contact length L due to the relationship of balanced force system represented by formula 6.

In this regard, it is also turned out that magnitude of deflection δ1 increases due to an increase in ground-contact length L according to aforementioned formula 1 and formula 2, thereby increasing shearing deformation in the tire circumferential direction of the tread rubber.

In view of this, the inventors of the present invention then discovered that use of a tire at a relatively high internal pressure effectively suppresses increase in ground-contact length in spite of a narrowed with of the tire.

Figure 7A:
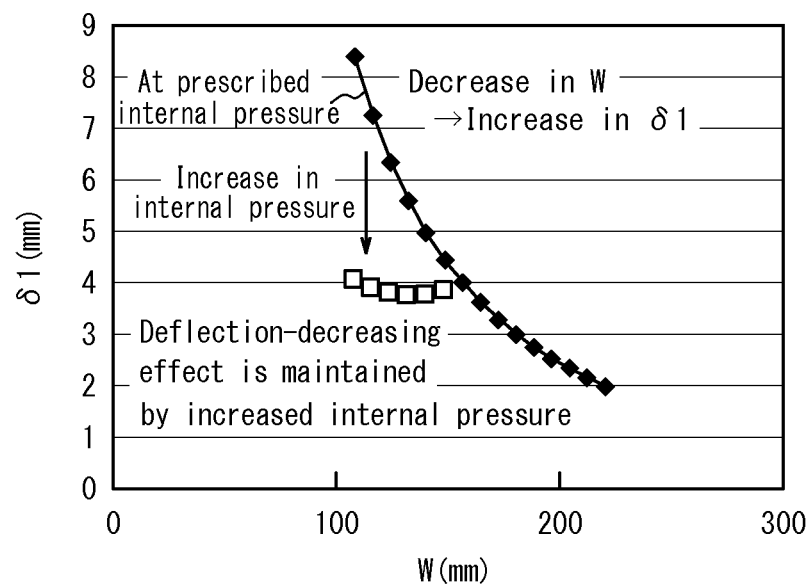
FIG. 7A is a view showing how magnitude of deflection δ1 changes when internal pressure of a tire is increased.
Figure 7B:
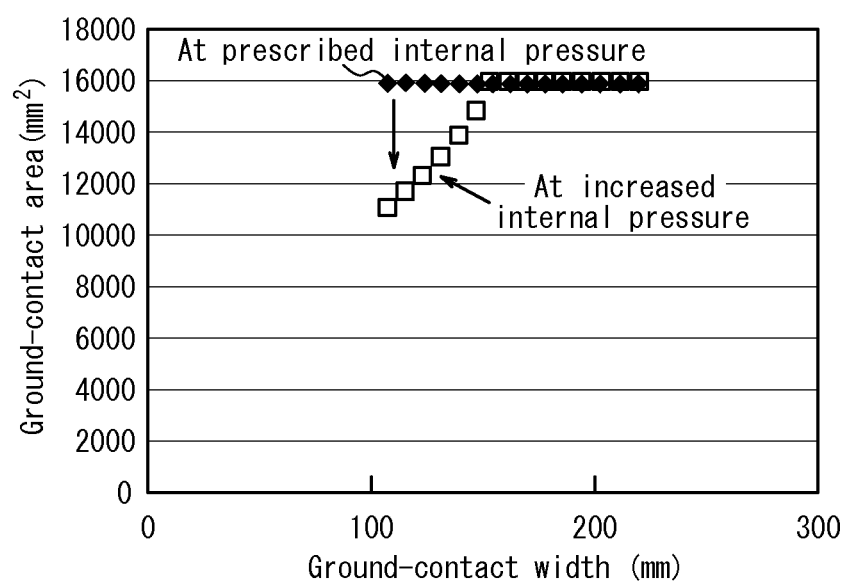
FIG. 7B is a view shoeing how ground-contact surface area is affected when internal pressure of a tire is increased.

Specifically, according to the relationship of balanced force system represented by formula 6, it is possible to sustain load without increasing ground-contact length, in spite of a narrowed ground-contact width, by using the tire at a relatively high pressure. FIG. 7A is a view showing how the relationship between ground-contact width W and magnitude of deflection δ1 in a tire having tire size: 195/65R15 and assembled with an application rim, under the maximum load exerted on the tire, changes when internal pressure of a tire is increased. FIG. 7B is a view showing how the relationship between ground-contact width W and ground-contact area in a tire having tire size: 195/65R15 and assembled with an application rim, under the maximum load exerted on the tire, changes when internal pressure of a tire is increased.

Decrease in ground-contact width W increases magnitude of deflection δ1 when the tire is inflated for use at a prescribed internal pressure, as shown in FIG. 7A, thereby decreasing an effect of suppressing shearing deformation in the circumferential direction of tread rubber. In this connection, the decrease in ground-contact width W does not contribute to reducing ground-contact area and the ground-contact area remains substantially constant due to increase in ground-contact length, as shown in FIG. 7B. In contrast, increase in magnitude of deflection δ1 is well suppressed in spite of decrease in ground-contact width by using the tire at a relatively high internal pressure, as shown in FIG. 7A. Further, decrease in ground-contact width W well reduces ground-contact area in this case, as shown in FIG. 7B.

As a result, shearing deformations in the circumferential direction and the widthwise direction of a tire when the tire is brought into contact with the ground are well suppressed, respectively, at high internal pressure, thereby significantly reducing a rolling resistance value of the tire.

Figures 8A, 8B:
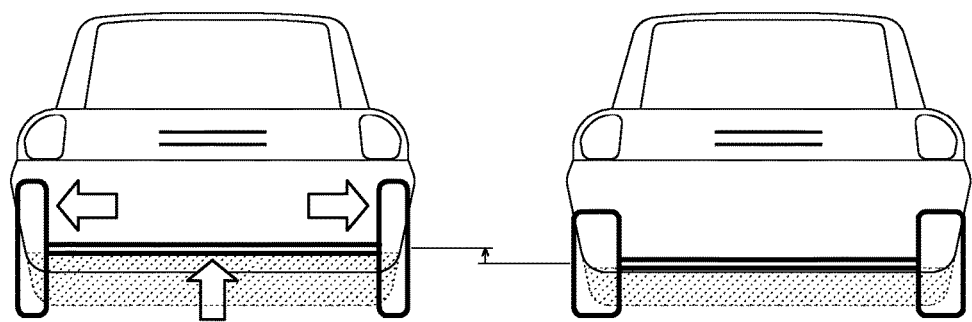
FIG. 8A and FIG. 8B are views explaining how wide space within a vehicle is ensured by increasing outer diameters and narrowing widths of tires.

Narrowing width of a tire allows a vehicle to keep a relatively large space therein (a wide space for accommodating driving units in the vicinity, on the vehicle-inner side, of the tire in particular), as shown in FIGS. 8A and 8B. Further, increasing outer diameter of a radial tire increases height of drive shafts to enlarge under-chassis space, thereby allowing the vehicle to keep wide spaces for a car boot, driving units and the like.

On the basis of the discoveries described above, the inventors of the present invention studied specific conditions under which both a rolling resistance value and weight of a tire can be reduced in a compatible manner by increasing outer diameter, narrowing width and increasing internal pressure of the tire.

First, there was prepared as Reference tire 1 a tire having tire size: 195/65R15, which tire is used in the most common types of vehicles and thus suitable for comparison of tire performances.

Further, there were prepared other test tires of various tire sizes, as well. Each of these test tires was assembled with a rim having widths corresponding to the bead widths of the tire and subjected to following tests at internal pressure of 220 kPa and an increased internal pressure, respectively. Table 1 shows relevant specific characteristics of the respective test tires. Other characteristics of each tire than those shown in Table 1 (e.g. internal structures thereof) were the same as those of a tire commonly in use. Each of the test tires included a carcass constituted of plies as radially-disposed cords and provided in a toroidal shape across a pair of bead portions.

With regard to tire sizes, a variety of tire sizes including the conventional sizes prescribed in JATMA, TRA, ETRTO and the like and those beyond these conventional sizes were widely studied.

Some test tires in particular were prepared as "sporty-style" tires having cross sectional width SW equal to or larger than 175 (mm).

In this connection, these "sporty-style" tires were compared with a tire having tire size: 225/45R17, i.e. Reference tire 2, which is an inch-up version of the tire having tire size: 195/65R15, i.e. Reference tire 1.

TABLE 1

|  | Tire | Tire size | SW/OD ratio |
|---|---|---|---|
| Conventional tire | Conventional tire 1 | 145/70R12 | 0.29 |
|  | Conventional tire 2 | 155/55R14 | 0.29 |
|  | Conventional tire 3 | 165/60R14 | 0.30 |
|  | Conventional tire 4 | 175/65R14 | 0.30 |
|  | Conventional tire 5 | 185/60R15 | 0.31 |
|  | Reference tire 1 | 195/65R15 | 0.31 |
|  | Conventional tire 6 | 205/55R16 | 0.32 |
|  | Conventional tire 7 | 215/60R16 | 0.32 |
|  | Conventional tire 8 | 225/55R17 | 0.33 |
|  | Conventional tire 9 | 245/45R18 | 0.36 |
|  | Conventional tire 10 | 155/65R13 | 0.29 |
|  | Reference tire 2 | 225/45R17 | 0.35 |
| Tire of present invention | Example tire 1 | 165/65R19 | 0.24 |
|  | Example tire 2 | 155/65R18 | 0.24 |
|  | Example tire 3 | 145/65R19 | 0.22 |
|  | Example tire 4 | 135/65R19 | 0.21 |
|  | Example tire 5 | 125/65R19 | 0.19 |
|  | Example tire 6 | 175/55R22 | 0.23 |
|  | Example tire 7 | 165/55R20 | 0.24 |
|  | Example tire 8 | 155/55R19 | 0.24 |
|  | Example tire 9 | 145/55R20 | 0.22 |
|  | Example tire 10 | 135/55R20 | 0.21 |
|  | Example tire 11 | 125/55R20 | 0.19 |
|  | Example tire 12 | 175/45R23 | 0.24 |
|  | Example tire 13 | 165/45R22 | 0.23 |
|  | Example tire 14 | 155/45R21 | 0.23 |
|  | Example tire 15 | 145/45R21 | 0.22 |
|  | Example tire 16 | 135/45R21 | 0.21 |
|  | Example tire 17 | 145/60R16 | 0.25 |
|  | Example tire 18 | 155/60R17 | 0.25 |
|  | Example tire 19 | 165/55R19 | 0.25 |
|  | Example tire 20 | 155/45R18 | 0.26 |
|  | Example tire 21 | 165/55R18 | 0.26 |
|  | Example tire 22 | 175/55R19 | 0.26 |
|  | Example tire 23 | 115/50R17 | 0.21 |
|  | Example tire 24 | 105/50R16 | 0.21 |
|  | Example tire 25 | 135/60R17 | 0.23 |
|  | Example tire 26 | 185/60R20 | 0.25 |

<Rolling Resistance Value (RR Value)>

Rolling resistance was measured by: assembling each of the test tires described above with a rim having widths corresponding to the bead widths of the tire, to obtain a tire-rim assembly; applying on the tire-rim assembly the maximum load prescribed for a vehicle on which the tire is mounted; and running the tire at drum rotation speed of 100 km/hour. The evaluation results are shown as index values relative to "100" of Reference tire 1. The smaller index value represents the smaller rolling resistance.

<Tire Weight>

Tire weight, measured for each of the test tires, is expressed as an index value relative to "100" of Reference tire 1 (the smaller index value represents the lighter weight).

The evaluation results of rolling resistance value and tire weight are shown in Table 2 and Table 3. The data of rolling resistance values and tire weights of the test tires are also used in the graphs shown in FIGS. 9 to 13.

TABLE 2

|  |  | 220 kPa | RR value (INDEX) | Internal pressure (kPa) | W (mm) | L(mm) | OD(mm) | δ1 (mm) | Tire weight (INDEX) |
|---|---|---|---|---|---|---|---|---|---|
| Conventional Tire | Conventional tire 1 |  | 120 | 220 | 111.65 | 162.8 | 507.8 | 12.1 | 61.3 |
|  | Conventional tire 2 |  | 125 | 220 | 119.35 | 152.3 | 526.1 | 10.4 | 61.9 |
|  | Conventional tire 3 |  | 118 | 220 | 127.05 | 143.1 | 553.6 | 8.8 | 71.6 |
|  | Conventional tire 4 |  | 109 | 220 | 134.75 | 134.9 | 583.1 | 7.5 | 82.5 |

TABLE 2-continued

|  |  | RR value (INDEX) 220 kPa | Internal pressure (kPa) | W (mm) | L(mm) | OD(mm) | δ1 (mm) | Tire weight (INDEX) |
|---|---|---|---|---|---|---|---|---|
|  | Conventional tire 5 | 106 | 220 | 142.45 | 127.6 | 603 | 6.5 | 87.4 |
|  | Reference tire 1 | 100 | 220 | 150.15 | 121.1 | 634.5 | 5.6 | 100 |
|  | Conventional tire 6 | 101 | 220 | 157.85 | 115.2 | 631.9 | 5.1 | 98.3 |
|  | Conventional tire 7 | 93 | 220 | 164.65 | 110.4 | 664.4 | 4.5 | 111.9 |
|  | Conventional tire 8 | 85 | 220 | 170.85 | 106.4 | 679.3 | 4.1 | 124.7 |
|  | Conventional tire 9 | 80 | 220 | 176.65 | 102.9 | 677.7 | 3.8 | 129.4 |
|  | Conventional tire 10 | 90 | 220 | 170.8 | 106.4 | 634.3 | 4.4 | 116.5 |
|  | Reference tire 2 | 90 | 220 | 170.8 | 106.5 | 634.3 | 4.37 | 116 |
| Tires of Present Invention | Example tire 1 | 98.9 | 220 | 127.1 | 143.1 | 697.1 | 7.1 | 93 |
|  | Example tire 2 | 106.7 | 220 | 119.4 | 152.3 | 658.7 | 8.5 | 82.5 |
|  | Example tire 3 | 107.5 | 220 | 111.7 | 162.8 | 671.1 | 9.5 | 78.6 |
|  | Example tire 4 | 111.7 | 220 | 104 | 174.9 | 658.1 | 11 | 71.8 |
|  | Example tire 5 | 116 | 220 | 96.3 | 188.9 | 645.1 | 13 | 65.2 |
|  | Example tire 6 | 88.3 | 220 | 134.8 | 134.9 | 751.3 | 5.9 | 99.7 |
|  | Example tire 7 | 99.3 | 220 | 128.3 | 141.7 | 689.5 | 7.1 | 86.3 |
|  | Example tire 8 | 106.8 | 220 | 120.5 | 150.8 | 653.1 | 8.4 | 76.8 |
|  | Example tire 9 | 107.4 | 220 | 112.8 | 161.2 | 667.5 | 9.3 | 73.4 |
|  | Example tire 10 | 111.4 | 220 | 105 | 173.2 | 656.5 | 10.9 | 67.2 |
|  | Example tire 11 | 115.4 | 220 | 97.2 | 187 | 645.5 | 12.8 | 61.2 |
|  | Example tire 12 | 89 | 220 | 136.1 | 133.6 | 741.7 | 5.9 | 92 |
|  | Example tire 13 | 96.3 | 220 | 129.6 | 140.3 | 707.3 | 6.8 | 82.7 |
|  | Example tire 14 | 103.5 | 220 | 121.7 | 149.3 | 672.9 | 8 | 73.9 |
|  | Example tire 15 | 107.2 | 220 | 113.9 | 159.6 | 663.9 | 9.2 | 68.2 |
|  | Example tire 16 | 111 | 220 | 106 | 171.5 | 654.9 | 10.7 | 62.7 |
|  | Example tire 17 | 102.7 | 220 | 114.6 | 158.7 | 580.4 | 10.2 | 65.9 |
|  | Example tire 18 | 100.1 | 220 | 122.5 | 148.4 | 617.8 | 8.5 | 75 |
|  | Example tire 19 | 94.2 | 220 | 130.4 | 139.4 | 664.1 | 7 | 83.1 |
|  | Example tire 20 | 105 | 220 | 122.5 | 148.4 | 596.7 | 8.8 | 65.5 |
|  | Example tire 21 | 96.2 | 220 | 130.4 | 139.4 | 638.7 | 7.3 | 79.9 |
|  | Example tire 22 | 93.6 | 220 | 131.3 | 138.5 | 675.1 | 6.2 | 89.6 |
|  | Example tire 23 | 118 | 220 | 92 | 197.6 | 546.8 | 16.3 | 48.2 |
|  | Example tire 24 | 120 | 220 | 89.3 | 203.7 | 511.4 | 18.2 | 41.2 |
|  | Example tire 25 | 113 | 220 | 108 | 168.3 | 593.8 | 11.3 | 65.9 |
|  | Example tire 26 | 102 | 220 | 138.8 | 131 | 730 | 5.7 | 109.4 |

TABLE 3

|  |  | RR value (INDEX) 220 kPa | Internal pressure (kPa) | W (mm) | L(mm) | OD(mm) | δ1 (mm) | Tire weight (INDEX) |
|---|---|---|---|---|---|---|---|---|
| Conventional Tire | Conventional tire 1 | 108 | 295 | 111.65 | 121.4 | 507.8 | 7 | 61.3 |
|  | Conventional tire 2 | 111.3 | 275 | 119.35 | 121.9 | 526.1 | 6.8 | 61.9 |
|  | Conventional tire 3 | 108.6 | 260 | 127.05 | 121.1 | 553.6 | 6.4 | 71.6 |
|  | Conventional tire 4 | 103.6 | 245 | 134.75 | 121.2 | 583.1 | 6.1 | 82.5 |
|  | Conventional tire 5 | 103.9 | 230 | 142.45 | 122.1 | 603 | 6 | 87.4 |
|  | Reference tire 1 | 100 | 220 | 150.15 | 121.1 | 634.5 | 5.6 | 100 |
|  | Conventional tire 6 | 101 | 220 | 157.85 | 115.2 | 631.9 | 5.1 | 98.3 |
|  | Conventional tire 7 | 93 | 220 | 164.65 | 110.4 | 664.4 | 4.5 | 111.9 |
|  | Conventional tire 8 | 85 | 220 | 170.85 | 106.4 | 679.3 | 4.1 | 115.9 |
|  | Conventional tire 9 | 80 | 220 | 176.65 | 102.9 | 677.7 | 3.8 | 117.7 |
|  | Conventional tire 10 | 90 | 220 | 170.8 | 106.4 | 634.3 | 4.4 | 116.5 |
|  | Reference tire 2 | 90 | 220 | 170.8 | 106.5 | 634.3 | 4.4 | 116 |
| Tires of Present Invention | Example tire 1 | 92.2 | 260 | 127.1 | 121.1 | 697.1 | 5.1 | 93 |
|  | Example tire 2 | 96 | 275 | 119.4 | 120.6 | 658.7 | 5.4 | 82.5 |
|  | Example tire 3 | 92.4 | 295 | 111.7 | 121.4 | 671.1 | 5.4 | 78.6 |
|  | Example tire 4 | 91.6 | 315 | 104 | 121 | 658.1 | 5.4 | 71.8 |
|  | Example tire 5 | 88.2 | 340 | 96.3 | 121.2 | 645.1 | 5.5 | 65.2 |
|  | Example tire 6 | 84.8 | 345 | 134.8 | 120.7 | 751.3 | 4.8 | 99.7 |
|  | Example tire 7 | 92.6 | 260 | 128.3 | 120.8 | 689.5 | 5.2 | 86.3 |
|  | Example tire 8 | 96.2 | 275 | 120.5 | 121.1 | 653.1 | 5.5 | 76.8 |
|  | Example tire 9 | 92.3 | 290 | 112.8 | 121.1 | 667.5 | 5.4 | 73.4 |
|  | Example tire 10 | 92.4 | 310 | 105 | 121.7 | 656.5 | 5.5 | 67.2 |
|  | Example tire 11 | 87.7 | 340 | 97.2 | 121 | 645.5 | 5.5 | 61.2 |
|  | Example tire 12 | 85.5 | 250 | 136.1 | 120.9 | 741.7 | 4.8 | 92 |
|  | Example tire 13 | 89.7 | 255 | 129.6 | 121 | 707.3 | 5.1 | 82.7 |
|  | Example tire 14 | 93.2 | 270 | 121.7 | 121.2 | 672.9 | 5.3 | 73.9 |
|  | Example tire 15 | 92.2 | 290 | 113.9 | 121.1 | 663.9 | 5.4 | 68.2 |
|  | Example tire 16 | 92.1 | 310 | 106 | 121.3 | 654.9 | 5.5 | 62.7 |
|  | Example tire 17 | 93.9 | 290 | 114.6 | 120.4 | 580.4 | 6 | 65.9 |
|  | Example tire 18 | 92.1 | 270 | 122.5 | 120.9 | 617.8 | 5.7 | 75 |
|  | Example tire 19 | 89.4 | 255 | 130.4 | 120.3 | 664.1 | 5.3 | 83.1 |

TABLE 3-continued

| 220 kPa | RR value (INDEX) | Internal pressure (kPa) | W (mm) | L(mm) | OD(mm) | δ1 (mm) | Tire weight (INDEX) |
|---|---|---|---|---|---|---|---|
| Example tire 20 | 92.1 | 270 | 122.5 | 120.9 | 596.7 | 5.9 | 65.5 |
| Example tire 21 | 89.4 | 255 | 130.4 | 120.3 | 638.7 | 5.5 | 79.9 |
| Example tire 22 | 88.7 | 250 | 131.3 | 121.9 | 675.1 | 5.3 | 89.6 |
| Example tire 23 | 86.7 | 350.0 | 92.0 | 124.2 | 546.8 | 6.8 | 48.2 |
| Example tire 24 | 94.1 | 350.0 | 89.3 | 128.0 | 511.4 | 7.7 | 41.2 |
| Example tire 25 | 85.6 | 300.0 | 108.0 | 123.4 | 593.8 | 6.2 | 65.9 |
| Example tire 26 | 73.0 | 270.0 | 138.8 | 106.7 | 730.0 | 3.8 | 109.4 |

Further, test tires 8, 15, 20 and 31 were each subjected to a test of evaluating a rolling resistance value of the tire according to the aforementioned method at variously changed internal pressure values.
The evaluation results are shown in Table 4 and FIG. 9

TABLE 4

| | Tire size | | | |
|---|---|---|---|---|
| Internal pressure (kPa) | 155/55R19 (Ex. 8) | 145/45R21 (Ex. 15) | 155/45R18 (Ex. 20) | 215/50R21 (Ex. 31) |
| | RR value (INDEX) | | | |
| 220 | 106.8 | 107.2 | 105 | 102 |
| 250 | 99 | 99 | 97 | 95 |
| 280 | 96 | 93 | 91 | 88 |
| 310 | 91.8 | 88.5 | 87 | 84 |
| 340 | 88 | 85 | 84 | 81 |
| 400 | 83 | 79 | 79 | 77 |

Figure 9:
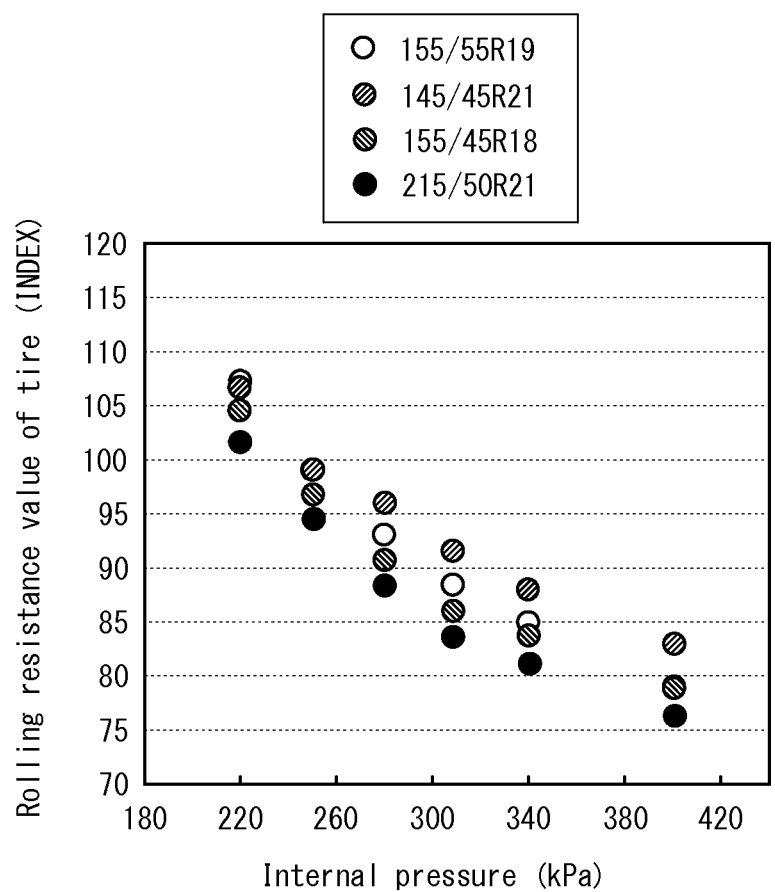
FIG. 9 is a view showing a relationship between internal pressure and rolling resistance value (RR value) of a tire.
Figure 10A:
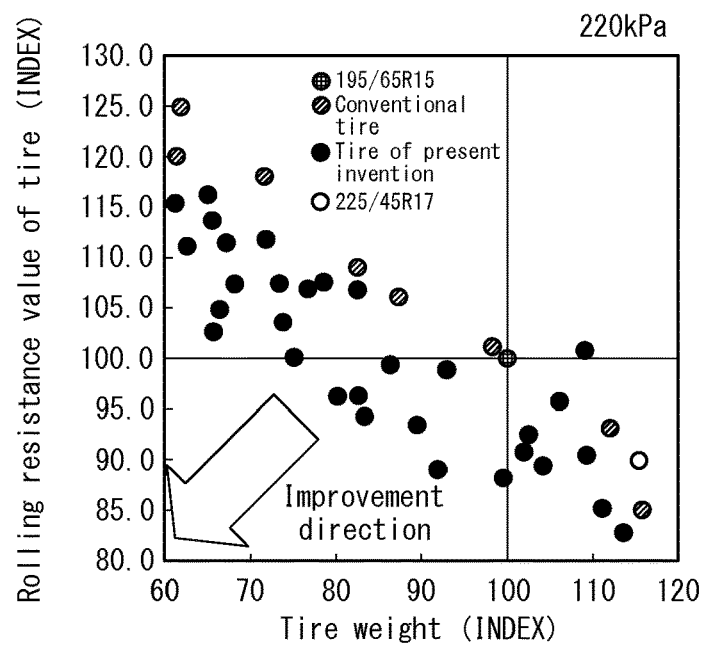
FIG. 10A is a view showing how properties regarding weight and rolling resistance value of a tire improve in the present invention at internal pressure of 220 kPa.
Figure 10B:
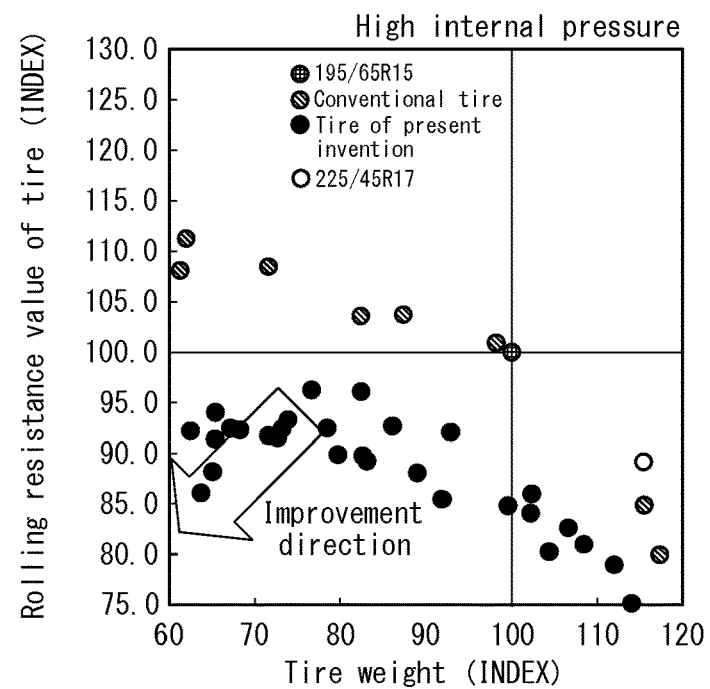
FIG. 10B is a view showing how properties regarding weight and rolling resistance value of a tire improve in the present invention at high internal pressure.
Figure 11A:
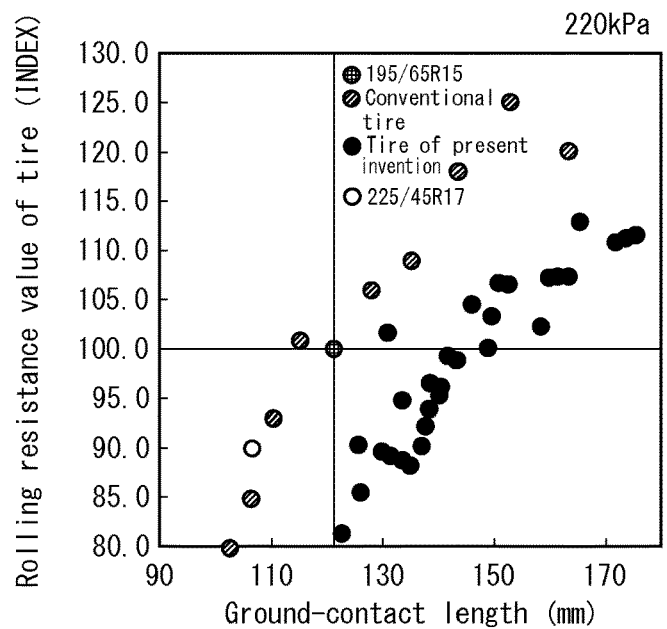
FIG. 11A is a view showing how properties regarding ground-contact length and rolling resistance value of a tire improve in the present invention at internal pressure of 220 kPa.
Figure 11B:
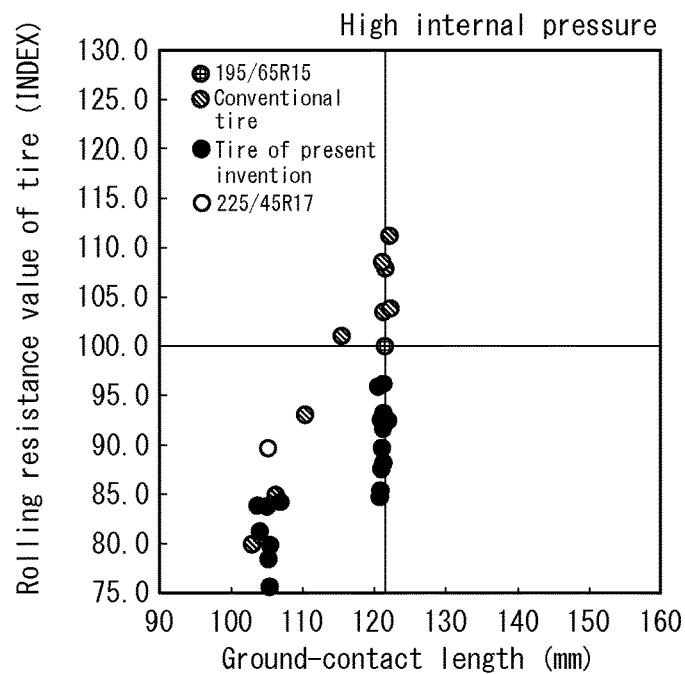
FIG. 11B is a view showing how properties regarding ground-contact length and rolling resistance value of a tire improve in the present invention at high internal pressure.
Figure 12A:
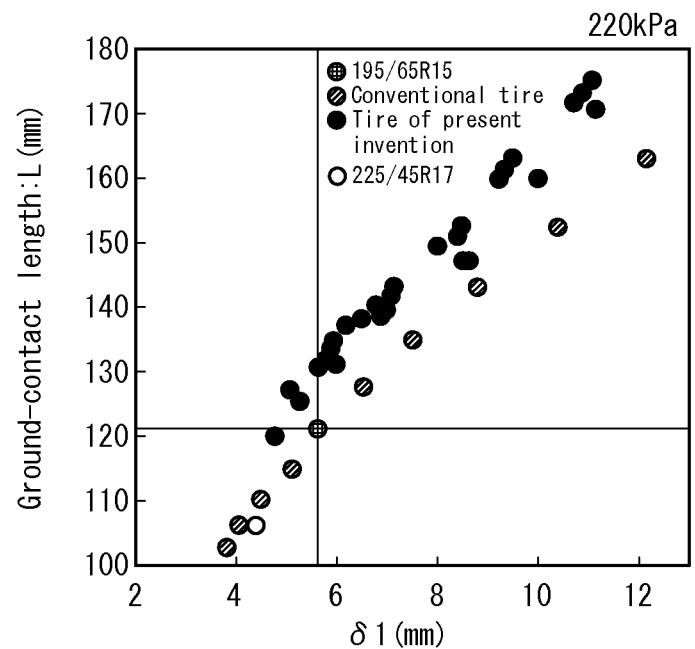
FIG. 12A is a view showing how properties regarding magnitude of deflection δ1 and ground-contact length of a tire improve in the present invention at internal pressure of 220 kPa.
Figure 12B:
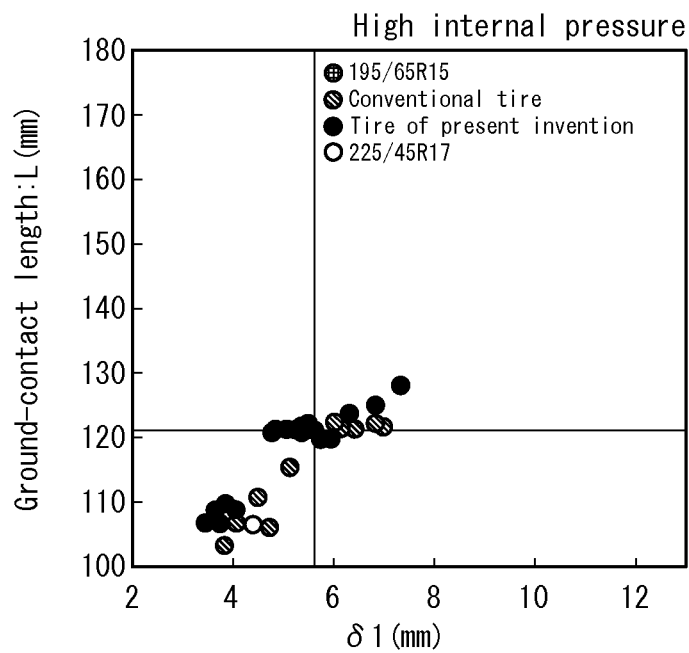
FIG. 12B is a view showing how properties regarding magnitude of deflection δ1 and ground-contact length of a tire improve in the present invention at high internal pressure.

It is understood from Tables 2-4, FIG. 9, FIG. 10A and FIG. 10B that test tires 1 to 26 each enable significantly reducing both a rolling resistance value and weight thereof when they are used at internal pressure of at least 250 kPa, as compared with Reference tire 1. Further, it is understood that the "sporty-style" test tires each enable significantly reducing both a rolling resistance value and weight thereof when they are used at internal pressure of at least 250 kPa, as compared with Reference tire 2. Internal pressure preferably does not exceed 350 KPa in the present invention.

The inventors of the present invention then studied further in detail at which size the test tires each enable significantly reducing both a rolling resistance value and weight thereof. FIG. 14A and FIG. 14B are views each showing relationship between cross sectional width SW (mm) and outer diameter OD (mm) in the tires of Examples and Conventional Examples.
As shown in FIG. 14A, the tires of Examples unanimously exhibit ratio SW/OD≤0.26 when cross sectional width SW<165 (mm). That is, it is understood that a tire having SW<165 (mm) and ratio SW/OD≤0.26 can significantly reduce both a rolling resistance value and weight thereof when the tire is used at internal pressure of at least 250 kPa. Further, as shown in FIG. 14A, the tires of Examples unanimously satisfy a relationship formula of cross sectional width SW and outer diameter OD shown below when SW≥165 (mm).

$$OD \geq 2.135 \times SW + 282.3$$

That is, it is understood that a tire having SW≥165 (mm) and satisfying the aforementioned relationship formula can significantly reduce both a rolling resistance value and weight thereof when the tire is used at internal pressure of at least 250 kPa.

Further, as a result of fitting a quadratic curve to the border line of the tire size at which both a rolling resistance value and weight of a tire can be significantly reduced, across the region of SW<175 (mm) and the region of SW≥175 (mm) in FIG. 14B, it turned out that a tire satisfying following formula can significantly reduce both a rolling resistance value and weight.

$$OD \geq -0.0187 \times SW^2 + 9.15 \times SW - 380$$

Figure 13:
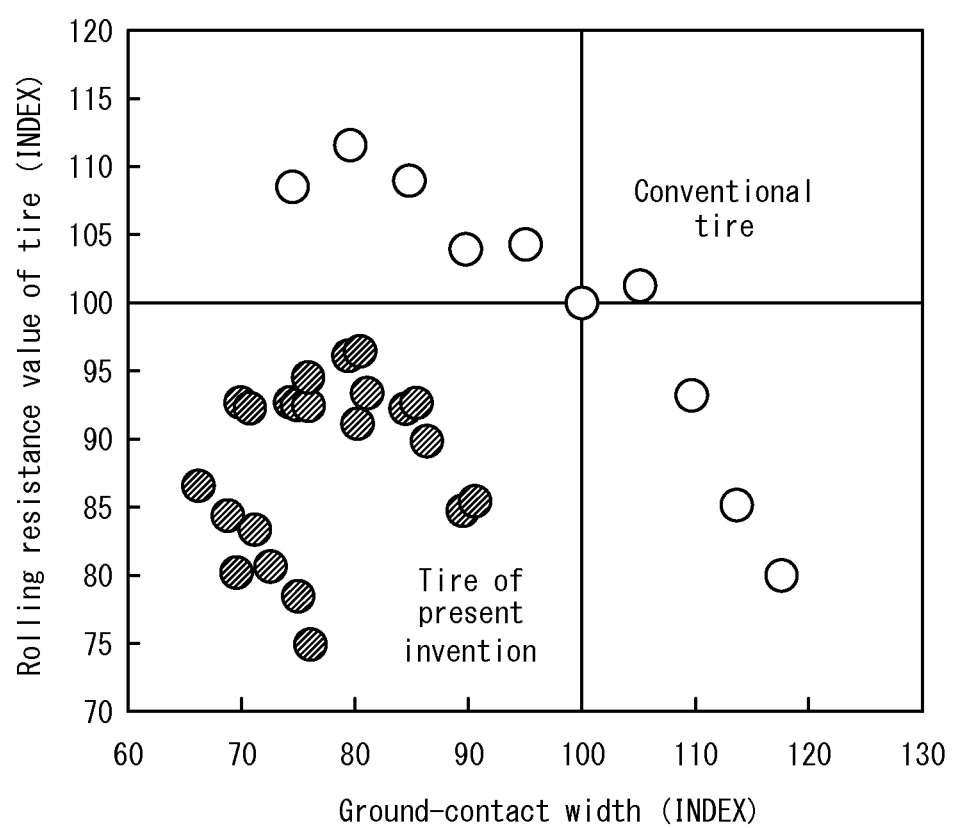
FIG. 13 is a view showing how properties regarding ground-contact width and rolling resistance value of a tire improve in the present invention.

It is preferable that SW/OD≤0.26 and it is more preferable that SW/OD≤0.24 in terms of significantly reducing both a rolling resistance value and weight of a tire.
Further, it is understood from Table 2, Table 3, FIG. 11A and FIG. 11B that it is possible to suppress increase in ground-contact length, which increase would be otherwise caused by decrease in ground-contact width, by increasing internal pressure such that ground-contact length remains substantially the same as in Reference tires. In this connection, it is understood from Table 2 and FIG. 12A that decrease in ground-contact width increases ground-contact length, thereby increasing magnitude of deflection δ1 when internal pressure is 220 kPa. In contrast, increase in ground-contact length and thus increase in magnitude of deflection δ1 can be suppressed by increasing internal pressure, as shown in Table 2 and FIG. 12B.
Accordingly, it is understood from Table 3 and FIG. 13 that both a rolling resistance value and weight of a tire can be significantly reduced in a compatible manner by: preparing a tire satisfying, in terms of cross sectional width SW and outer diameter OD thereof, SW/OD≤0.26 (SW<165 (mm)); assembling the tire with a rim having widths corresponding to the bead widths of the tire; and using the tire such that ground-contact width thereof is 150 mm or less when the maximum load, prescribed for a vehicle on which the tire is mounted, is exerted on the tire. Further, it is understood that both a rolling resistance value and weight of a tire can be significantly reduced in a compatible manner by: preparing a tire having size satisfying the formula: OD≥2.135×SW+282.3 (SW≥165 (mm)); assembling the tire with a rim having widths corresponding to the bead widths of the tire; and using the tire such that ground-contact width thereof is 175 mm or less when the maximum load, prescribed for a vehicle on which the tire is mounted, is exerted on the tire. Yet further, it is understood that both a rolling resistance value and weight of a tire can be significantly reduced in a compatible manner by: preparing a tire having size satisfying the formula: OD≥−0.0187×SW²+9.15×SW−380; assembling the tire with a rim having widths corresponding to the bead widths of the tire; and using the tire such that ground-contact width thereof is 175 mm or less when the maximum load, prescribed for a vehicle on which the tire is mounted, is exerted on the tire. In FIG. 13, a case where ground-contact width is equal to 150 mm is expressed by an index value (INDEX) "100" and the smaller INDEX represents the narrower ground-contact width. Ground-contact width of a tire is preferably at least 90 mm in terms of ensuring axial force of the tire high enough to attain enhanced stability and security of a vehicle. In this connection, ground-contact length of the tire is preferably in the range of 90 mm to 140 mm.

In a case where cross sectional width SW and outer diameter OD of a tire satisfy either SW/OD≤0.26 (SW<165 (mm)) and OD≥2.135×SW+282.3 (SW≥165 (mm)) when linear equations are fitted to the aforementioned border line or OD≥−0.0187×SW²+9.15×SW−380 when a quadratic curve is fitted to the border line, ground contact-area of the tire preferably does not exceed 16,000 mm² under the maximum load on the tire, prescribed for a vehicle on which the tire is mounted, because then both a rolling resistance value and weight of the tire can be significantly reduced in a compatible manner.

The aforementioned ground-contact area is preferably at least 10,000 mm² in terms of ensuring axial force of the tire high enough to attain enhanced stability and security of a vehicle.

In order to analyze an effect of increasing internal pressure of a tire, a test was carried out for each of test tires of various sizes by changing internal pressure applied thereto and evaluating a rolling resistance value and weight of the tire.

Figure 15:
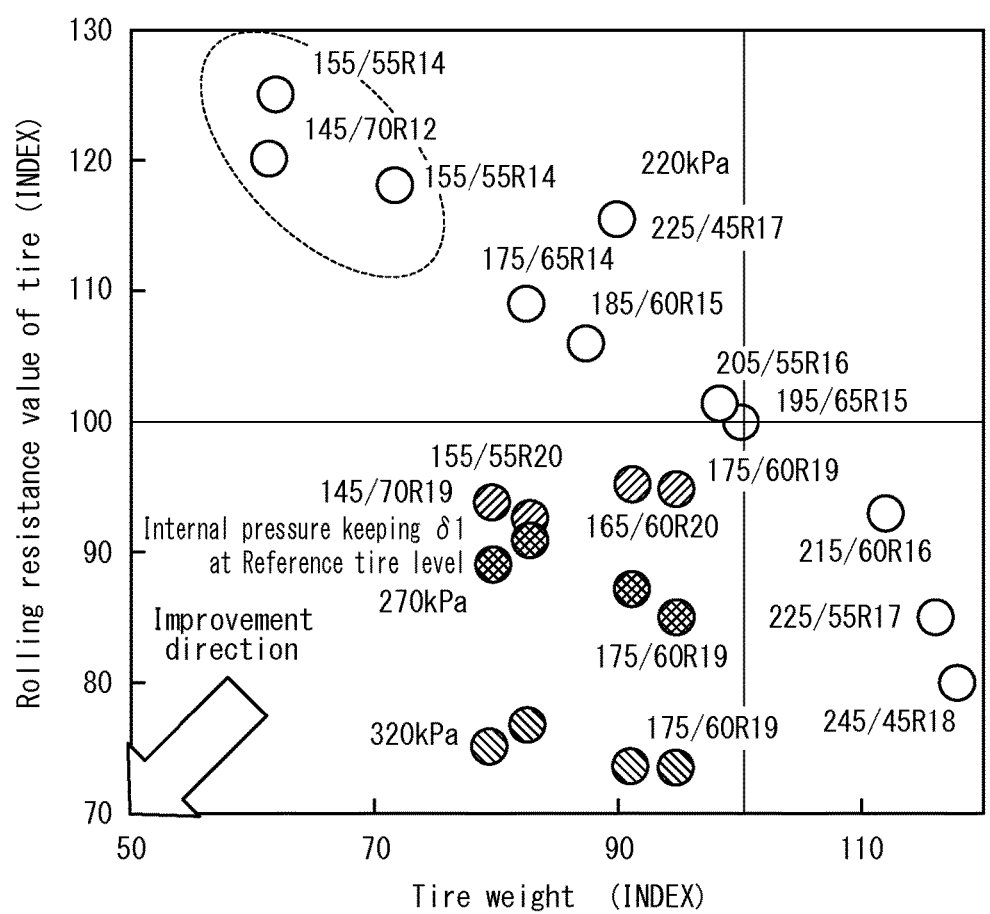
FIG. 15 is a view showing correlation between weight and rolling resistance value in each of various tires.

The relevant characteristics and evaluation results of the respective test tires are shown in Table 5 and FIG. 15.

TABLE 5

| | Tire size | Internal pressure (kPa) | RR value (INDEX) | Tire weight (INDEX) |
|---|---|---|---|---|
| Conventional tire | 145/70R12 | 220 | 120 | 45 |
| | 155/55R14 | 220 | 125 | 49 |
| | 165/60R14 | 220 | 118 | 61 |
| | 175/65R14 | 220 | 109 | 74 |
| | 185/60R15 | 220 | 106 | 83 |
| | 195/65R15 | 220 | 100 | 100 |
| | 205/55R16 | 220 | 101 | 101 |
| | 215/55R17 | 220 | 93 | 121 |
| | 225/55R17 | 220 | 85 | 131 |
| | 245/45R18 | 220 | 80 | 136 |
| | 225/45R17 | 220 | 90 | 116.5 |
| At internal pressure keeping magnitude of deflection δ1 at Reference tire level | 145/70R19 | 265 | 92.5 | 79 |
| | 155/55R20 | 256 | 93.8 | 75 |
| | 165/60R20 | 250 | 95.1 | 93 |
| | 175/60R19 | 250 | 93.2 | 92 |
| At high internal pressure (Case 1) | 145/70R19 | 270 | 90.7 | 79 |
| | 155/55R20 | 270 | 88.9 | 75 |
| | 165/60R20 | 270 | 87 | 93 |
| | 175/60R19 | 270 | 85.5 | 92 |
| At high internal pressure (Case 2) | 145/70R19 | 320 | 76.6 | 79 |
| | 155/55R20 | 320 | 75 | 75 |
| | 165/60R20 | 320 | 73.4 | 93 |
| | 175/60R19 | 320 | 72.9 | 92 |

It is understood from Table 5 and FIG. 15 that it is possible to significantly reduce both a rolling resistance value and weight of a tire by: preparing a tire where cross sectional width SW and outer diameter OD thereof satisfy either SW/OD≤0.26 (SW<165 (mm)) and OD≥2.135×SW+282.3 (SW≥165 (mm)) when linear equations are fitted to the aforementioned border line or OD≥−0.0187×SW²+9.15×SW−380 when a quadratic curve is fitted to the border line; and using the tire in a high internal pressure condition in which magnitude of deflection δ1 remains substantially the same as in Reference tires in spite of a narrowed ground-contact width of the tire. In this connection, it is understood that it is possible to reduce a rolling resistance value more by using the same tire satisfying the aforementioned conditions at internal pressure of at least 270 kPa and further more by using the tire at internal pressure of at least 320 kPa.

Structures of a tire preferable in terms of using the tire at a high internal pressure condition of at least 250 kPa will be described hereinafter.

First, a carcass preferably has a "high turn-up" structure in which ends of at least one carcass ply are situated on the outer side in the radial direction of the maximum width portion of the tire and the carcass more preferably has an "envelope" structure in which ends of at least one carcass ply are situated between the carcass and a belt in the radial direction.

Second, the belt having high rigidity is preferably used. Specifically, Young's modulus of belt cords is preferably at least 45,000 MPa.

Sufficiently high strength of a tire allowing the tire to be used at high internal pressure is ensured by optimizing the carcass structure and the belt structure described above.

Third, an inner liner of the tire preferably has thickness of at least 0.6 mm because then air leakage in a state of high internal pressure is well suppressed.

The invention claimed is:

1. A tire-rim assembly formed by assembling bead portions of a passenger vehicle pneumatic radial tire with a rim, characterized in that:
   the tire is a tubeless tire having an inner liner on an inner surface thereof;
   an aspect ratio of the tire is less than 70;
   the tire has a carcass comprising plies as radially-disposed cords and provided in a toroidal shape across a pair of the bead portions;
   the tire-rim assembly has an internal pressure of at least 250 kPa;
   provided that SW and OD represent a cross sectional width and an outer diameter of the tire, respectively, the following conditions are met:

SW/OD≤0.26; and 145 (mm)≤SW<165 (mm), provided that D represents a rim diameter of the tire, SW and D satisfy the following condition:

0.30<SW/D<0.36, the tire-rim assembly is filled only with gas,
   wherein the rim diameter of the tire is greater than or equal to 457.2 mm and less than or equal to 533.4 mm, and
   wherein the outer diameter of the tire is greater than or equal to 653.1 mm and less than or equal to 707.3 mm.

2. The tire-rim assembly of claim 1, wherein SW/OD≤0.24.

3. The tire-rim assembly of claim 1, wherein the inner liner of the tire has thickness of at least 0.6 mm.

4. The tire-rim assembly of claim 1, wherein the aspect ratio of the passenger vehicle pneumatic radial tire is greater than or equal to 55.

* * * * *